C. J. RIXEN.
DEVICE FOR THE PREVENTION OF AIR LOSSES IN LIQUID CONTAINERS UNDER AIR PRESSURE.
APPLICATION FILED JAN. 25, 1915.
1,191,469.
Patented July 18, 1916.
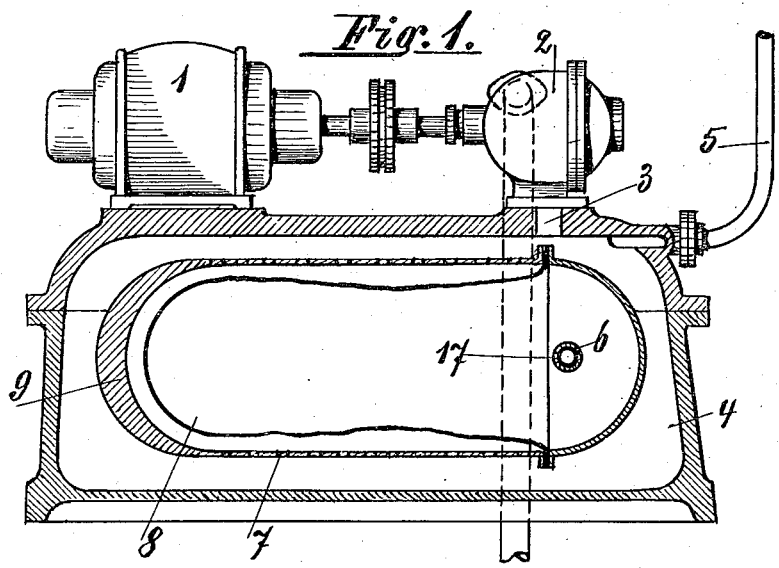
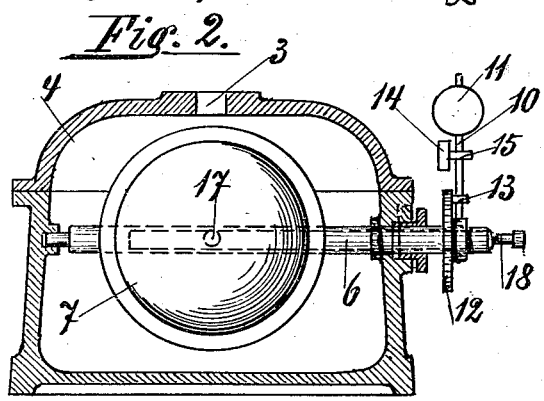
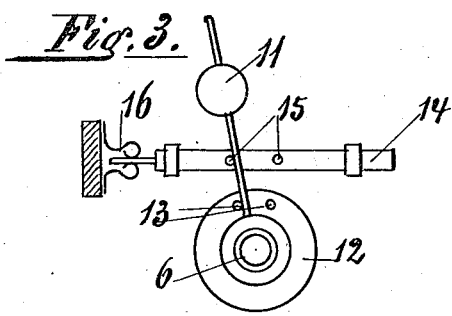
Witnesses:
E. G. McGee.
J. M. Hartig.
Inventor:
Carl Johan Rixen
By Emil Powelycke
Attorney

UNITED STATES PATENT OFFICE.

CARL JOHAN RIXEN, OF AERÖSKÖBING, DENMARK.

DEVICE FOR THE PREVENTION OF AIR-LOSSES IN LIQUID-CONTAINERS UNDER AIR-PRESSURE.

1,191,469.            Specification of Letters Patent.     Patented July 18, 1916.

Application filed January 25, 1915. Serial No. 4,380.

*To all whom it may concern:*

Be it known that I, CARL JOHAN RIXEN, a subject of the King of Denmark, and resident of Aerösköbing, Denmark, have invented certain new and useful Improvements in Devices for the Prevention of Air-Losses in Liquid-Containers Under Air-Pressure, of which the following is a specification.

With automatic house water supply plants, as known, the employment of a highly situated reservoir is avoided by inserting in the pipe from the water pump a container which is partly filled with air. This container is provided with a device which puts the motor for driving the pump out of gear upon a certain maximum pressure being attained and again in gear as soon as the pressure in the container has fallen down to a certain degree. Such pressure-containers have the drawback that the air inclosed, of which the quantity is essential for a reliable working of the whole plant, is gradually absorbed by the water. Numerous attempts have been made to overcome this drawback by leading the quantity of air lost again into the container. Such devices have, however, not been successful, because they need a certain inspection or supervision, which is difficult for private houses, for which the plants in question are particularly designed.

According to the present invention, the air is kept separate from the pressure-container without any damage to its compressibility, so that the air cannot enter the water. For this purpose, the required quantity of air is inclosed by a bag of resilient, preferably watertight material, for instance india rubber, which is stored in the water container preferably in such a way that it is accessible from outside through a closable pipe for its being filled.

The compressibility of the air inclosed by the rubber bag is not impaired by the separation from the water, whereas the reciprocative action between air and water and thus the absorption of the air by the water is completely avoided. The air bag need not necessarily consist of watertight material, as there is no pressure difference between the interior of the bag and the liquid surrounding the same, which might cause an exchange of the two agents. For the same reason, the air bag may consist of a very thin fabric, as there is no need for a certain firmness of the same.

The invention is not limited to the employment in connection with water supply plants of the type mentioned, it offering besides the advantages mentioned the further advantage that the air bag can be used at the same time as a float for operating the switch for putting the motor for the pump in or out of gear. With the known controlling means of this kind, generally a spring-pressed plunger is so acted upon by the pressure medium that it overcomes the tension of a spring, upon an adjustable maximum pressure being attained, and thereby operates an electric switch or the controlling mechanism of the engine. Upon the pressure having fallen down to a certain minimum degree, the plunger is moved by the spring pressure in the opposite direction, whereby it operates to switch or the like also in opposite direction. These known devices have the drawback that they are not sensitive enough owing to the large and variable friction resistances of the plunger and the unfavorable varying tension of the spring, while besides the adjustment of certain pressure-limits is rather difficult. With another known kind of controlling mechanism, floats are employed in a water container and adapted to actuate the switch at highest and lowest level. This device is very simple but has the drawback that it can be employed with open containers only in which the liquid is in direct contact with the atmosphere. For house water supply plants, however, it cannot be employed as the air is here gradually absorbed by the water whereby the position of the float would be altered. By the construction of the float as an air bag, which is hereinafter described, all the drawbacks mentioned are effectively overcome.

The accompanying drawing shows several constructional forms of the subject matter of the invention.

Figure 1 is a vertical longitudinal section through a water supply plant, Fig. 2 a cross-section through the same, and Fig. 3 an end view of a detail of the same.

Referring to Figs. 1 to 3:—The rotary pump 2 driven by the motor 1 supplies the water through the channel 3 into the pressure-container 4 from which the pipe 5 leads to the taps in the house. In the pressure-container 4, a float 7 is movably located on an axle 6, said float consisting of perforated sheet metal and containing an air bag 8 of rubber. The air bag is connected with the two-part float by being clamped between the flanges of the two parts. On its free end, the float is fitted with a weight 9 which suits the shape of said end. The turning-axle 6 of the float is with one end led to the outside through a stuffing-box and carries here a device for operating the switch for the current of the driving motor 1. This switch forms a tipping-switch known in the art. For this purpose, a lever 10 is loosely mounted on the axle 6 and on its upper end provided with an adjustable weight 11. The axle 6 carries a fixed disk 12 which is fitted with two pins 13. These pins lie within reach of the weighted lever 10. Above the disk 12 a rail 14 forming the switch proper is movably located and also provided with two pins 15 between which the weighted lever is located. On its left hand end, the rail 14 carries a switch blade, which acts in unison with the spring contact 16.

The operation of the arrangement is as follows:—Assuming the pump 2 may be in gear and supply to the container 4 more water than can be consumed by the pipe 5, whereby the pressure is increased and the air bag 8 is compressed. Consequently, the buoyancy is decreased and the weight 9 pulls the float down while the left hand pin 13 presses the weighted lever 10 to the right after having passed over the maximum position whereby the lever strikes against the right hand pin 15 of the switch rail 14, which thereby is moved to the right and interrupts the contact at 16. Upon the pressure in the container 4 being decreased, the air bag is widened and its buoyancy is increased, whereby the tipping-switch is operated in the opposite direction and the pump is again put in gear. By increasing the tipping weight, the difference between the pressures for putting in or out of gear respectively can be varied at will. Also by pumping more or less air in the bag 8, the switch-limits may be commonly determined for a higher or lower degree. The higher the existing air pressure is, the higher is also the pressure at which the bag is completely filled, that is at which the buoyancy is sufficient for operating the switch. The pumping-in of the air is effected through the hollow turning-axle 6, which in the interior of the float is in communication with the cavity of the air bag through a boring 17. On the outside, the hollow axle is fitted with a valve 18, which serves for connection of the air-pump thereto.

Of course, the movement of the float may also be such that it acts on the controlling device of the driving engine of pumps, compressors and the like as well as on a throttle-valve, if it is for instance the question of controlling the pressure of a water conduit automatically. With compression plants, the water boiler can be connected to the pressure-conduit of the plant. The float can, of course, be suspended in any other way, for instance so as to be adjustable in vertical direction. As counterweight for the float, also a spring may be provided. The body of the float need not consist of a closed case, because it is to hold the air bag only and to transmit the pressure of the buoyancy, for which purpose also a cage-like wire case would suffice.

The air bag of the float, which besides may consist of a fixed hollow body with a wall of flexible material movable on one side only, has, besides the described effect, the function to allow the reception of varying water quantities in the container 3, a function which with the known water supply plants of this type is executed by the free air space above the water level. In the present case, the container is completely filled with water, which is however completely separated from the air by the walls of the bag, whereby the air is prevented from being gradually absorbed by the water.

What I claim is:

1. A device for the prevention of air losses in liquid containers under air pressure, comprising a container for the reception of a liquid, means for supplying liquid to the container, a bag having a compressible agent therein received in the container and liquid, said compressible agent being adapted to be compressed by the liquid, and means actuated upon the increase and decrease of the compression of the agent for regulating the supplying of liquid to the container.

2. A device of the type specified, comprising a liquid container, a perforated hollow body movably suspended in the container and designed to be completely immersed in the liquid in the container, and an air bag in said hollow body, substantially as and for the purpose set forth.

3. A device of the type specified, comprising a liquid container, a hollow axle therein projecting with one end beyond the container, a valve to close said axle end, a float movably mounted with one end on said axle, and an air bag in said hollow body to communicate with the hollow in said axle, substantially as and for the purpose set forth.

4. A device for the prevention of air losses in liquid containers under air pressure, comprising a container for the reception of a liquid, means for supplying liquid to the container, a bag having a compressible agent therein received in the container and liquid, said compressible agent being adapted to be compressed by the liquid, a switch for controlling the supply of liquid to the container, and means connecting the switch to the bag for causing the operation of the switch upon the increase and decrease of the compression of the agent of the bag for governing the supply of liquid to the container.

In witness whereof I have hereunto signed my name in the presence of two subscribing witnesses.

CARL JOHAN RIXEN.

Witnesses:
 FREORBIC EBERLE,
 VALDEMAR NIELSEN.